(12) United States Patent
Leyko et al.

(10) Patent No.: US 9,540,109 B2
(45) Date of Patent: Jan. 10, 2017

(54) TURBOMACHINE COMPRISING A DEVICE FOR THE COOLING OF A PYLON

(71) Applicant: SNECMA, Paris (FR)

(72) Inventors: Matthieu Leyko, Melun (FR); Jean Bertucchi, Thiais (FR); Julien Szydlowski, Montrouge (FR)

(73) Assignee: SNECMA, Paris (FR)

( * ) Notice: Subject to any disclaimer, the term of this patent is extended or adjusted under 35 U.S.C. 154(b) by 289 days.

(21) Appl. No.: 14/446,552

(22) Filed: Jul. 30, 2014

(65) Prior Publication Data

US 2015/0284098 A1 Oct. 8, 2015

(30) Foreign Application Priority Data

Jul. 30, 2013 (FR) ...................................... 13 57534

(51) Int. Cl.
| | | |
|---|---|---|
| *B64D 27/00* | (2006.01) | |
| *B64D 13/00* | (2006.01) | |
| *B64D 29/00* | (2006.01) | |
| *F02K 1/82* | (2006.01) | |
| *F02C 7/20* | (2006.01) | |
| *B64D 33/08* | (2006.01) | |
| *B64C 7/02* | (2006.01) | |
| *B64D 27/12* | (2006.01) | |

(Continued)

(52) U.S. Cl.
CPC .............. *B64D 13/006* (2013.01); *B64C 7/02* (2013.01); *B64D 27/12* (2013.01); *B64D 27/26* (2013.01); *B64D 29/00* (2013.01); *B64D 33/04* (2013.01); *B64D 33/08* (2013.01); *F02C 7/20* (2013.01); *F02K 1/822* (2013.01); *F05D 2260/20* (2013.01); *F05D 2260/231* (2013.01); *Y02T 50/675* (2013.01)

(58) Field of Classification Search
None
See application file for complete search history.

(56) References Cited

U.S. PATENT DOCUMENTS

| | | | | |
|---|---|---|---|---|
| 4,712,750 A | * | 12/1987 | Ridgwell ................. | B64C 7/02 244/117 A |
| 4,825,648 A | * | 5/1989 | Adamson ............... | B64D 29/00 60/226.1 |

(Continued)

FOREIGN PATENT DOCUMENTS

| | | |
|---|---|---|
| EP | 2 543 864 A2 | 1/2013 |
| FR | 2 983 172 A1 | 5/2013 |
| WO | WO 2011/104488 A1 | 9/2011 |

OTHER PUBLICATIONS

French Preliminary Search Report issued May 13, 2014 in French Application 13 57534, filed on Jul. 30, 2013 ( with English Translation of Categories of Cited Documents).

*Primary Examiner* — Medhat Badawi
(74) *Attorney, Agent, or Firm* — Oblon, McClelland, Maier & Neustadt, L.L.P.

(57) ABSTRACT

A turbomachine including a nozzle extending along an axial direction and configured to convey a hot gas stream; and a mounting pylon for mounting the turbomachme, in which the pylon extends radially from a base arranged in the vicinity of the nozzle, is provided. The turbomachine includes a pylon cooler device having at least one auxiliary gas duct having a gas inlet configured to take cold gas from the outside of the nozzle, and a gas outlet opening out in the vicinity of the base of the pylon.

10 Claims, 4 Drawing Sheets

(51) Int. Cl.
  *B64D 27/26*  (2006.01)
  *B64D 33/04*  (2006.01)

(56) References Cited

U.S. PATENT DOCUMENTS

| | | | | |
|---|---|---|---|---|
| 5,012,639 | A * | 5/1991 | Ream | B64D 29/00 60/226.1 |
| 5,156,353 | A * | 10/1992 | Gliebe | B64C 21/025 244/130 |
| 5,887,822 | A * | 3/1999 | Thornock | B64D 33/04 244/53 R |
| 6,554,224 | B2 * | 4/2003 | Sternberger | F02K 1/766 244/110 B |
| 8,474,750 | B2 * | 7/2013 | Marche | B64D 27/26 244/53 R |
| 8,869,507 | B2 * | 10/2014 | Cloft | F02K 1/68 239/265.27 |
| 2009/0064658 | A1 * | 3/2009 | Beutin | F02K 1/34 60/226.2 |
| 2009/0261198 | A1 * | 10/2009 | Bonnaud | B64C 7/00 244/54 |
| 2012/0001019 | A1 * | 1/2012 | Morvant | B64D 29/02 244/54 |
| 2012/0068011 | A1 * | 3/2012 | Thomas | B64C 7/02 244/1 N |
| 2012/0247083 | A1 * | 10/2012 | Leyko | F01D 25/14 60/226.1 |
| 2012/0247571 | A1 * | 10/2012 | Vauchel | B64D 29/06 137/15.1 |
| 2013/0032663 | A1 * | 2/2013 | Dravet | B64C 7/02 244/54 |
| 2013/0174572 | A1 * | 7/2013 | Raison | B64C 7/02 60/782 |
| 2013/0243589 | A1 * | 9/2013 | Caruel | B64D 29/06 415/213.1 |
| 2013/0312387 | A1 * | 11/2013 | West | F02K 1/09 60/226.2 |
| 2014/0202169 | A1 * | 7/2014 | Gaillot | B64C 7/02 60/797 |
| 2014/0234090 | A1 * | 8/2014 | Hurlin | B64D 29/06 415/182.1 |
| 2014/0339357 | A1 * | 11/2014 | Richardson | B64D 29/02 244/54 |
| 2015/0284098 | A1 * | 10/2015 | Leyko | B64D 33/08 244/54 |
| 2015/0321765 | A1 * | 11/2015 | Brochard | B64D 27/26 244/54 |
| 2015/0330249 | A1 * | 11/2015 | Budnick | F01D 25/12 415/116 |
| 2015/0330250 | A1 * | 11/2015 | Scott | F01D 9/065 415/177 |

\* cited by examiner

TURBOMACHINE COMPRISING A DEVICE FOR THE COOLING OF A PYLON

FIELD OF THE INVENTION

The present invention relates to a turbomachine cooler device, and more particularly to a device for cooling a mounting pylon of a turbomachine.

The term "turbomachine" designates any gas turbine apparatus producing drive, including in particular turbojets that deliver thrust needed for jet propulsion by ejecting hot gas at high speed, and turboshaft engines in which the drive is delivered by rotating a drive shaft. For example, turboshaft engines are used as engines for helicopters, ships, trains, or indeed for industrial plants. Turboprops (turboshaft engines driving propellers) are also turboshaft engines used as aeroengines.

STATE OF THE PRIOR ART

A turbomachine is known that has a nozzle extending along an axial direction, said nozzle being configured to convey a hot gas stream, and a mounting pylon via which the turbomachine is mounted, said pylon extending radially from a base that is arranged in the vicinity of the nozzle.

In such a turbomachine, the hot gas from the nozzle heats the pylon, thereby leading to problems of mechanical strength and to problems of lifetime for the pylon.

In order to remedy that problem, it is known to use materials that withstand such thermal and mechanical stresses. Nevertheless, such a solution is onerous. It is also known to arrange stream disruptors in order to deflect the hot gas. Nevertheless, such disruptors generally have a negative impact on the performance of the turbomachine, or else they are not genuinely effective.

There therefore exists a need to provide an improved turbomachine.

SUMMARY OF THE INVENTION

In an embodiment, the turbomachine comprises a nozzle extending along an axial direction, said nozzle being configured to convey a hot gas stream, and a mounting pylon for mounting the turbomachine, said pylon extending radially from a base arranged in the vicinity of the nozzle, and a pylon cooler device having at least one auxiliary gas duct having a gas inlet configured to take cold gas from outside the nozzle, and a gas outlet opening out in the vicinity of the base of the pylon, the pylon including a rear mount for mounting a turbine casing thereto, the auxiliary duct being arranged inside a rear mount fairing.

In general, within a turbomachine, the axial direction corresponds to the direction of the axis of rotation A of the compressor(s) and the turbine(s) of the turbomachine, and a radial direction is a direction perpendicular to the axis A. The azimuth direction corresponds to the direction describing a ring around the axial direction. These three directions, axial, radial, and in azimuth, correspond respectively to the directions defined by the longitudinal axis, the radius, and the angle in a system of cylindrical coordinates. In addition, "upstream" and "downstream" are defined relative to the normal gas flow direction (from upstream to downstream) through the turbomachine. Unless specified to the contrary, the adjectives "inner" and "outer" are used relative to the radial direction so that the inner portion (i.e. the radially inner portion) of an element is closer to the axis A than is the outer portion (i.e. the radially outer portion) of the same element.

It can be understood that the pylon is a device that extends radially relative to the turbomachine, thereby enabling the turbomachine to be mounted on a main structure, for example a structure of an airplane (e.g. an airplane wing), the structure of a helicopter, of a hovercraft, etc. The base (also known to the person skilled in the art as the "deck") is the radial end of the pylon located beside the nozzle. Naturally, the pylon supports all of the components of the turbomachine, being fastened to casings of the turbomachine, e.g. but not necessarily, a turbine casing and/or a fan casing and/or a casing known to the person skilled in the art as an "intermediate casing", depending on the type of turbomachine.

It can also be understood that the turbomachine includes one or more auxiliary ducts. Below, and unless specified to the contrary, the term "the auxiliary duct" should be understood to mean "the auxiliary duct(s)".

The term "vicinity of the base" is used to mean a zone adjacent to the base of the pylon extending in all directions (axial, radial, and in azimuth) over a distance of about 50% of the length of the pylon in the corresponding direction (axial, radial, or in azimuth).

The rear mount of the pylon is a specific mount including in particular links that take up the twist forces imparted to the pylon by the rotary movements of the turbines and compressors of the turbomachine. The rear mount fairing is a fairing for protecting the rear mount, this fairing providing continuity for the wall that defines the gas flow passage, i.e. aerodynamic continuity.

In operation, a hot gas stream flows inside the nozzle while cold gas flows outside the nozzle. Naturally, the term "hot" and "cold" should be considered relative to each other, the gas flowing inside the nozzle being hotter than the gas flowing outside the nozzle (which gas is colder than the gas flowing inside the nozzle).

The auxiliary duct takes cold gas from outside the nozzle (in other words the gas inlet is open to the outside of the nozzle) and conveys this cold gas in the vicinity of the pylon base towards the pylon base. Thus, the cold gas cools the pylon, and more particularly the pylon base, by forming a film of cold gas that protects it from thermal convection of the hot gas. The cooler device thus protects the pylon from heating due to the hot gas, and it does so without degrading the performance of the turbomachine, and at a cost that is acceptable.

Furthermore, by arranging the auxiliary duct inside the rear mount fairing, the overall size of the cooling device is minimized. In other words, integration of the cooler device within the turbomachine is optimized. Furthermore, by arranging the auxiliary duct in this way, the aerodynamic disturbances induced in the gas stream are negligible, while the effectiveness of said cooling device is optimized by being located within the turbomachine.

In certain embodiments, the gas inlet faces upstream.

By facing in this way, the pylon cooler device is made even easier to incorporate, and cold gas can be taken in particularly effective manner.

In certain embodiments, the gas inlet is arranged at an upstream end of the rear mount fairing.

Such a gas inlet improves incorporation of the pylon cooler device, by enabling cold gas to be taken in particularly effective manner and by minimizing the impact of taking cold gas from the cold gas stream.

In certain embodiments, the nozzle presents a hot gas stream exhaust (i.e. an outlet), the gas outlet of the auxiliary duct opening out radially between the pylon and the exhaust of the nozzle.

In this configuration, the hot gas stream from the gas outlet of the auxiliary duct (i.e. the cooling gas) and as conveyed by the auxiliary duct is interposed between the pylon and the stream of hot gas coming from the exhaust of the nozzle. By means of this configuration, it is ensured that the pylon is impacted by the cooling gas instead of by the hot gas, thereby protecting the pylon from the hot gas and forming a gas film along the pylon, and in particular along the base of the pylon. Thus, the pylon is maintained at a temperature that is acceptable.

In certain embodiments, the gas outlet of the auxiliary duct extends in azimuth over substantially the entire length in azimuth of the base.

The term "substantially the entire length in azimuth of the base" is used to mean at least 55% of the length in azimuth of the base, in radial projection at the gas outlet from the auxiliary duct. Naturally, it should be understood that when the cooler device has a plurality of auxiliary ducts, it is the combined length in azimuth of all of the gas outlets (i.e. the sum of the lengths in azimuth of each of the gas outlets) that constitutes the length that extends over substantially the entire length in azimuth of the base.

By means of this extent in azimuth of the gas outlet, distribution of the cooling gas over the pylon is optimized. The extent of the envelope around the pylon and the base of the pylon as formed by a cooling gas film is likewise optimized. This serves to improve the cooling and the protection of the pylon.

In certain embodiments, the nozzle presents a hot gas stream exhaust, the gas outlet of the auxiliary duct being arranged axially substantially in the vicinity of the exhaust of the nozzle.

The term "axially in the vicinity" or "in the axial neighborhood" is used to mean an axial zone that extends around the exhaust over about 50% of the axial length of the nozzle.

By placing the gas outlet of the auxiliary duct in this way, the effectiveness of the cooling gas stream is improved. Specifically, the stream of cooling gas becomes interposed more easily between the pylon and the stream of hot gas coming from the exhaust.

In certain embodiments, the turbomachine is of the bypass type having a primary stream of hot gas and a secondary stream of cold gas, the nozzle being configured to convey the primary stream of hot gas, while the gas inlet of the auxiliary duct is configured to take gas from the secondary stream of cold gas.

The cooling device is particularly well adapted to bypass turbomachines. In particular, taking cold gas from the secondary stream makes it possible at the outlet from the auxiliary duct to obtain a cooling gas stream that presents characteristics, in particular in terms of pressure and speed, that are substantially the same as the gas of the secondary stream at the outlet from the turbomachine. Furthermore, by taking gas from the secondary stream, losses associated with taking (or scooping) this gas stream are limited since the gas is taken in a zone where the gas presents a speed that is low. The impact of the cooler device on the performance of the turbomachine is thus negligible. Thus, in certain embodiments, the auxiliary duct is configured so that the expansion of gas (i.e. the gas conveyed by the auxiliary duct) at the gas outlet of the auxiliary duct is substantially equal to the expansion of gas in the secondary stream of cold gas at the outlet from the turbomachine.

In certain embodiments, the nozzle forms a first nozzle while a second nozzle is configured for conveying the secondary stream of cold gas, the gas inlet of the auxiliary duct being arranged upstream from an outlet of the second nozzle.

Such positioning of the gas inlet of the auxiliary duct relative to the outlet of the second nozzle serves to ensure that no exchange can take place between the gas of the primary stream and the gas of the secondary stream, thereby further improving the effectiveness of the cooling.

In certain embodiments, the section of the auxiliary duct varies between the gas inlet and the gas outlet.

It can thus be understood that the shape and/or the area of the section of the auxiliary duct vary over all or part of the length of the auxiliary duct. This makes it possible in particular to obtain predetermined characteristics (e.g. in terms of pressure and speed) for the cooling gas stream at the gas outlet of the auxiliary duct. This also makes it possible to minimize the size of the auxiliary duct within the turbomachine.

In certain embodiments, the turbomachine has two auxiliary ducts, the gas inlets of the auxiliary ducts being arranged in azimuth on either side of the pylon.

It may be assumed that two ducts are arranged on either side of the pylon when seen in radial section of the turbomachine, each duct being arranged on a respective side of the mid-line of the pylon extending in the radial direction. Such a configuration serves to optimize the effectiveness of the cooler device while minimizing its size.

BRIEF DESCRIPTION OF THE DRAWINGS

The invention and its advantages can be better understood on reading the following detailed description of various embodiments of the invention given as non-limiting examples. The description refers to the accompanying sheets of figures, in which.

DETAILED DESCRIPTION OF EMBODIMENTS

Figure 1:
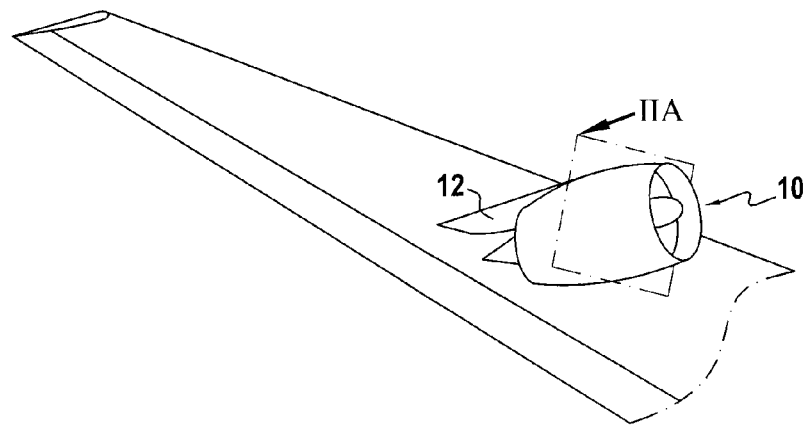
FIG. 1 shows a turbojet mounted under an airplane wing.
Figure 3:
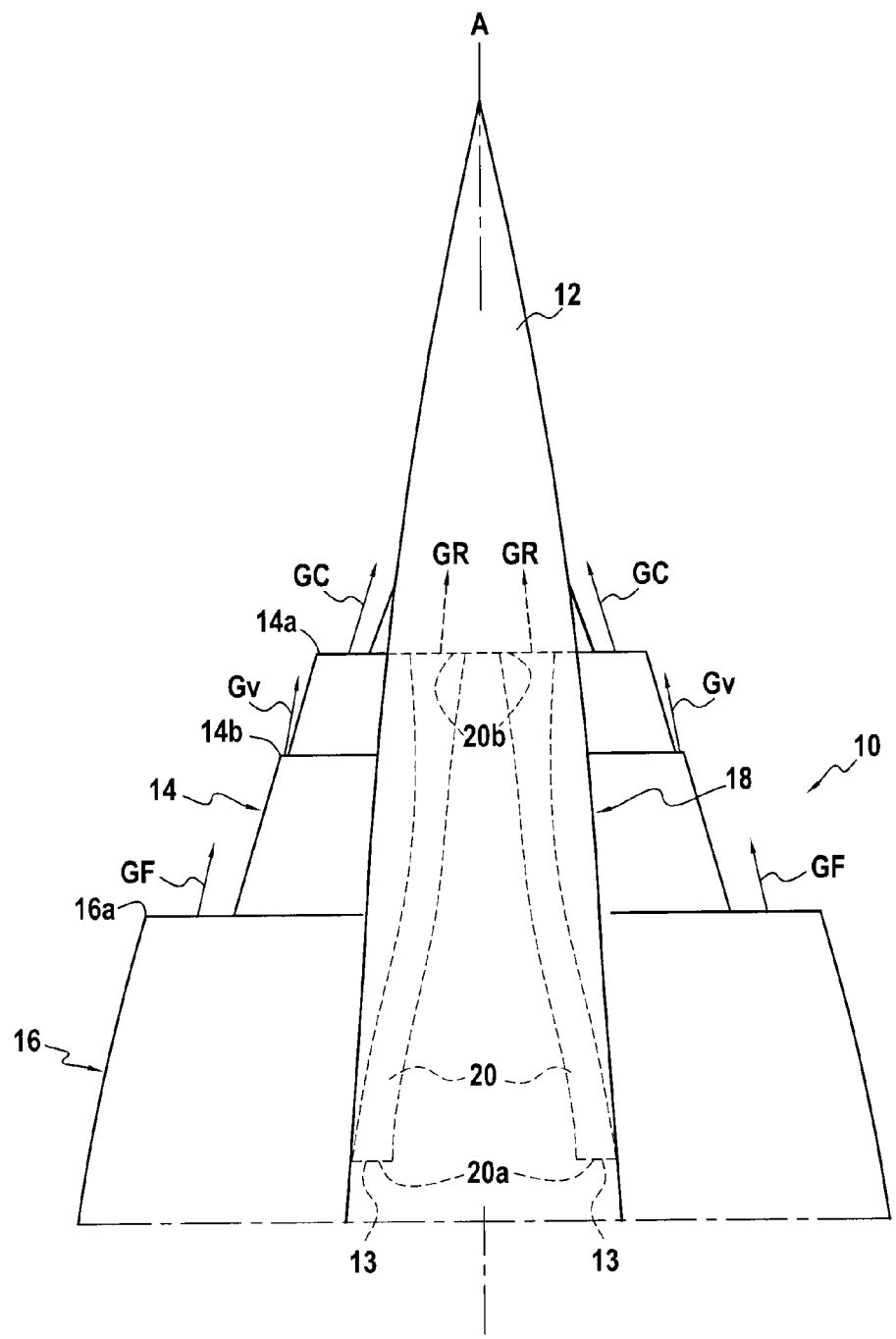
FIG. 3 shows the FIG. 1 turbojet seen looking along arrow III of FIG. 2.
Figure 4:
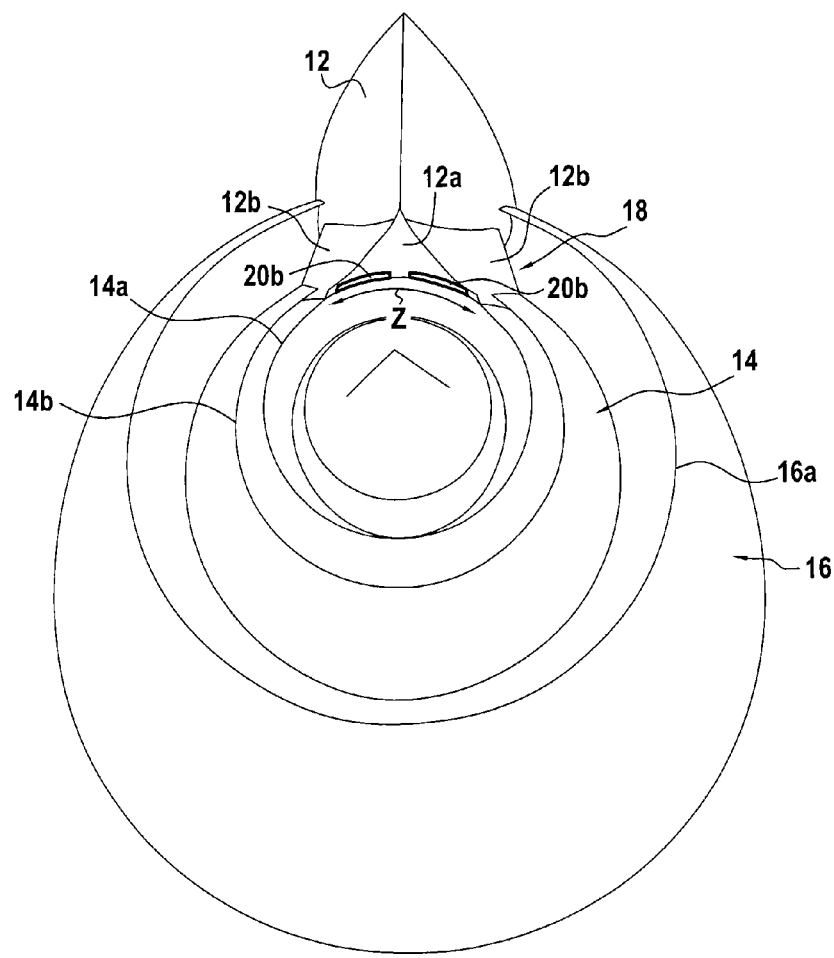
FIG. 4 shows the FIG. 1 turbojet seen looking along arrow IV of FIG. 2.

FIG. 1 shows a turbomachine, in this example a turbojet 10, having a pylon 12 and fastened by the pylon 12 to an airplane wing. The turbojet 10 is described in greater detail with reference to FIGS. 2, 3, and 4.

Figure 2A:
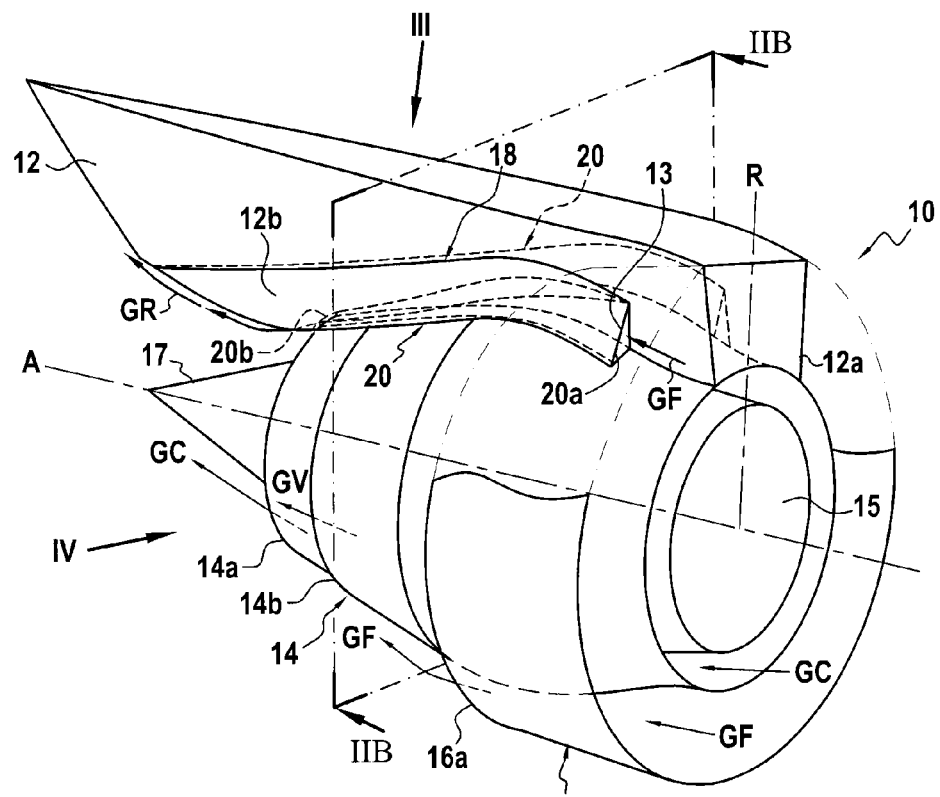
FIG. 2A shows the FIG. 1 turbojet seen in perspective on section plane IIA of FIG. 1.

FIG. 2 shows the turbojet 10 in perspective and in section on plane IIA of FIG. 1. The turbojet 10 comprises a nozzle 14 (or first nozzle 14) extending along an axial direction A corresponding to the axis of rotation of the turbine 15. The turbojet also has a second nozzle 16 for the secondary stream and presenting an outlet 16a. The second nozzle 16 is coaxial with the first nozzle 14, being outside the first nozzle 14. The turbojet 10 is a bypass turbojet in which the first nozzle 14 conveys a hot gas stream GC (or primary stream of hot gas) while the second nozzle 16 conveys a cold gas stream GF (or secondary stream of cold gas). More particularly, the hot gas stream GC flows inside the first nozzle 14, while the cold gas stream GF flows between the first nozzle 14 and the second nozzle 16. The downstream axial end 14a of the first nozzle 14 forms the exhaust outlet of the first nozzle 14. In this example, the turbojet 10 also has an ejection cone 17. Naturally, in a variant, the turbojet need not have an ejection cone. In this example, the first nozzle 14 also has an intermediate outlet 14b for ventilation gas GV. The ventilation gas GV is used to ventilate components of the turbomachine without contributing directly to its propulsive effect. Naturally, in a variant, the first nozzle need not have an intermediate outlet.

Figure 2B:
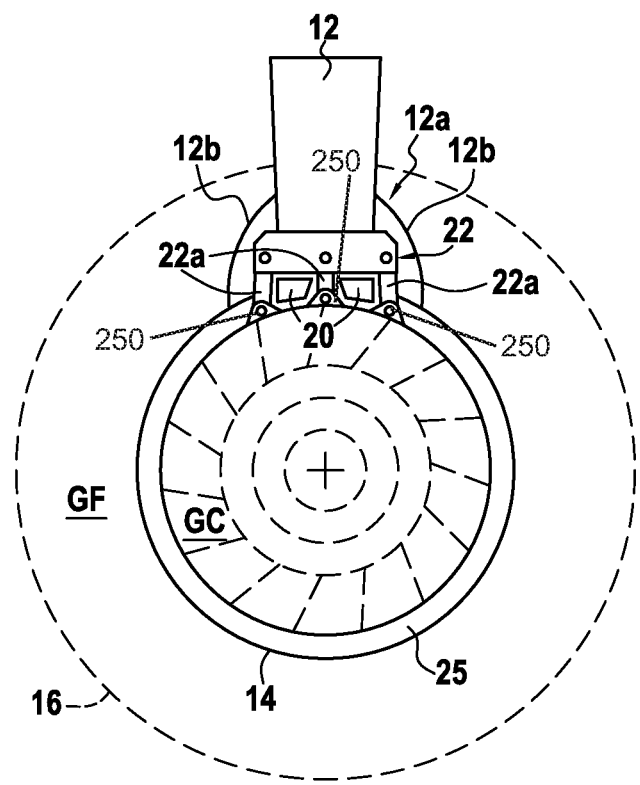
FIG. 2B shows the FIG. 1 turbojet seen on section plane IIB of FIG. 2.
Figure 5:
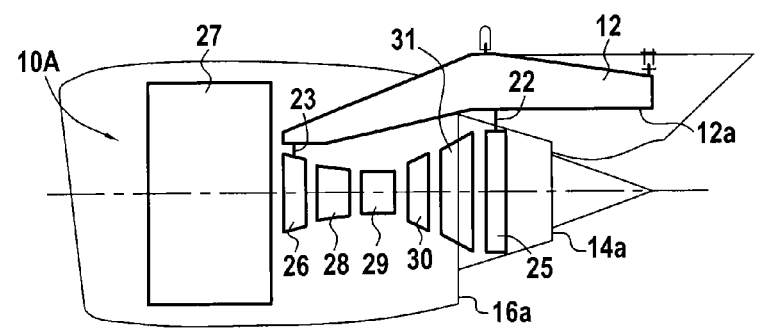
FIG. 5 is a diagram showing how the turbomachine body is attached to the pylon.

The pylon 12 extends in a radial direction R from a base 12a. More particularly, in this example, the base 12a of the pylon 12 includes a rear mount 22 for mounting a turbine casing 25 on the pylon, as shown in FIG. 2B. The rear mount 22 has a plurality of links 22a distributed in azimuth, and in this example it has three links 22a. A fairing of the rear mount 12b protects the rear mount 22 and provides aerodynamic continuity for the cold gas stream GF. In general manner, the mounting of the body 10A of the turbojet 10 on the pylon 12 is shown in FIG. 5, in which there can be seen the rear mount 22 to which the turbine casing 25 is mounted and a front mount 23 to which an intermediate casing is mounted that is located axially between the fan 27 and a low pressure compressor 28. More precisely, an internal shroud 26 of the intermediate casing is mounted on the front mount 23. It should be observed that the body 10A of the turbomachine 10 also comprises, from upstream to downstream: a high pressure compressor 29, a combustion chamber 30, a high pressure turbine 31, the turbine casing 25 in this non-limiting example housing a low pressure turbine and containing an annular flange 250 fastened to the rear mount 22.

The turbojet 10 has a pylon cooler device 18 that, in this example, comprises two auxiliary gas ducts 20 arranged in azimuth on either side of the pylon 12, being incorporated in the rear mount fairing 12b. Each duct 20 has a gas inlet 20a taking gas from the cold gas stream GF, and a gas outlet 20b leading to the vicinity of the base 12a of the pylon 12, radially between the exhaust outlet 14a and the base 12a (cf. FIG. 4). In other words, in this example, the gas outlets 20b open out radially "under" the base 12a (the term radially "under" should be understood as meaning that the base is on the outside relative to the outlet, or that the outlets are on the inside relative to the base, and substantially in radial alignment). In this example, the two outlets 20b extend in azimuth over substantially the entire length in azimuth Z of the base 12a of the pylon 12, and more particularly over about 80% of the length in azimuth Z of the base 12a of the pylon 12. Naturally, in a variant, the two outlets 20b could extend in azimuth over the entire length in azimuth Z of the base 12a of the pylon 12, i.e. over 100% thereof. Furthermore, the gas outlets 20b are arranged at the same axial position as the exhaust outlet 14a (cf. FIG. 3). The gas outlets 20b are also arranged downstream from the intermediate outlet 14b for ventilation gas GV, in line with the intermediate outlet. This configuration presents the advantage that the stream of cooling gas GR creates a cooling film under the base 12a while contributing to the overall thrust of the turbojet 10, the cooling gas stream GR flowing substantially axially. As shown in FIG. 2, the gas inlet 20a faces upstream and directly receives a fraction of the cold gas stream GF. The gas inlet 20a is arranged in the upstream end 13 of the fairing 12b of the rear mount 22.

The cross-section of each gas duct 20 varies going from the gas inlet 20a, to the gas outlet 20b.

Specifically, the shape of the section of the duct 20 at its inlet 20a, is substantially triangular, whereas at the gas outlet 20b, the shape of the section of the duct is substantially in the shape of a portion of a ring (or a shape that is substantially rectangular).

The cooling gas stream GR leaving the gas outlets 20b forms a film of gas over the downstream portion of the base 12a of the pylon 12, thereby preventing the hot gas stream GC coming from the exhaust outlet 14a (i.e. downstream from the exhaust) from coming into contact with the pylon 12 and its base 12a. Furthermore, the gas stream GR cools the pylon 12 and its base 12a or keeps them at a temperature that is acceptable.

Although the present invention is described with reference to specific embodiments, it is clear that modifications and changes could be undertaken on those embodiments without going beyond the general scope of the invention as defined by the claims. In particular, individual characteristics of various embodiments as shown and/or mentioned above may be combined in additional embodiments. Consequently, the description and the drawings should be considered in a sense that is illustrative rather than restrictive.

The invention claimed is:

1. A turbomachine comprising:
   a nozzle extending along an axial direction, said nozzle being configured to convey a hot gas stream;
   a mounting pylon for mounting the turbomachine, said pylon extending radially from a base arranged in the vicinity of the nozzle; and
   a pylon cooler device having an auxiliary gas duct having a gas inlet configured to take cold gas from outside the nozzle, and a gas outlet opening out in the vicinity of the base of the pylon,
   wherein the pylon includes a front mount for mounting an intermediate casing, located axially between a fan and a low pressure compressor of the turbomachine, to the pylon, and a rear mount for mounting a turbine casing to the pylon, the rear mount including a plurality of links distributed in azimuth and being fastened to a flange provided on the turbine casing housing a low pressure turbine of the turbomachine,
   wherein the auxiliary duct is arranged inside a rear mount fairing which protects the rear mount and provides aerodynamic continuity for a stream of the cold gas,
   wherein the gas inlet is arranged in an upstream end of the rear mount fairing , and
   wherein the gas outlet is arranged radially between an exhaust outlet of the nozzle and the base of the pylon, and is arranged axially at a same axial position as the exhaust outlet of the nozzle.

2. The turbomachine according to claim 1, wherein the gas inlet faces upstream.

3. The turbomachine according to claim 1, wherein the nozzle presents a hot gas stream exhaust.

4. The turbomachine according to claim 1, wherein the gas outlet of the auxiliary duct extends in azimuth over substantially the entire length in azimuth of the base.

5. The turbomachine according to claim 1, the turbomachine being a bypass type having a primary stream of hot gas and a secondary stream of cold gas, the nozzle being configured to convey the primary stream of hot gas, while the gas inlet of the auxiliary duct is configured to take gas from the secondary stream of cold gas.

6. The turbomachine according to claim 5, wherein the nozzle forms a first nozzle and a second nozzle is configured for conveying the secondary stream of cold gas, the gas inlet of the auxiliary duct being arranged upstream from an outlet of the second nozzle.

7. The turbomachine according to claim 5, wherein the auxiliary duct is configured so that expansion of gas at the gas outlet is substantially equal to expansion of gas in the secondary stream of cold gas at the outlet from the turbomachine.

8. The turbomachine according to claim 1, wherein a section of the auxiliary duct varies between the gas inlet and the gas outlet.

9. The turbomachine according to claim 1, having two auxiliary ducts, the gas inlets of the auxiliary ducts being arranged in azimuth on either side of the pylon.

10. The turbomachine according to claim 1, wherein the gas outlet is arranged axially downstream of an intermediate outlet of the nozzle for ventilation gas used to ventilate components of the turbomachine without directly contributing to propulsion.

* * * * *